May 17, 1960     H. J. MASON     2,936,490
PROCESS OF BONDING CAST METAL AND PLASTIC
Filed July 12, 1956
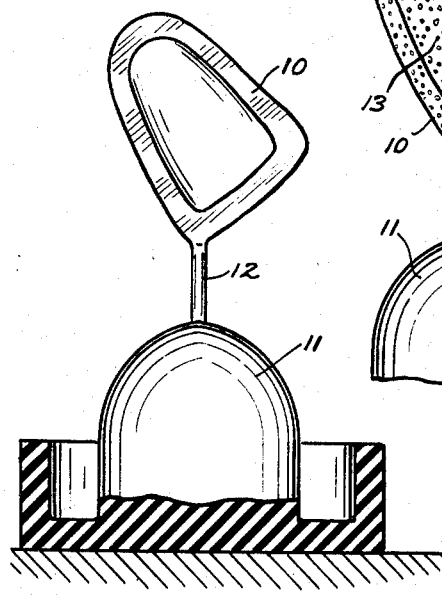
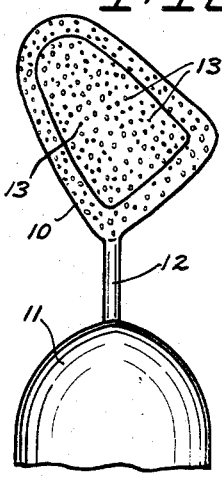
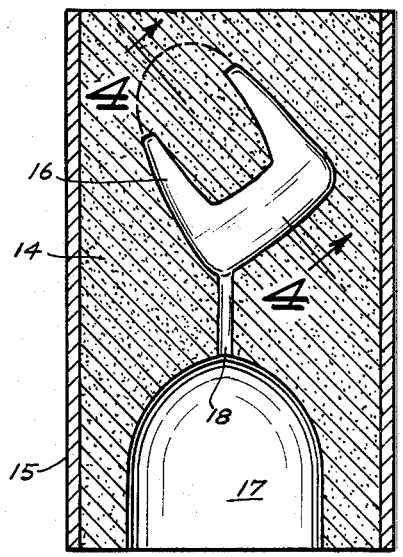
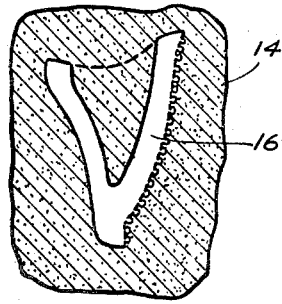
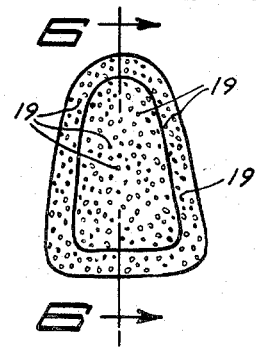
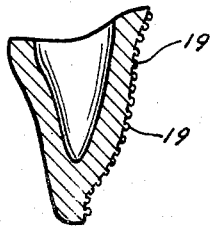
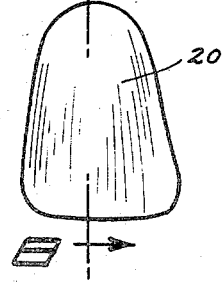
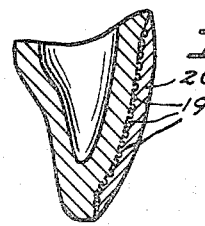
INVENTOR.
HAROLD J. MASON
BY
Braddock and Braddock
ATTORNEYS United States Patent Office 2,936,490
Patented May 17, 1960

2,936,490

PROCESS OF BONDING CAST METAL AND PLASTIC

Harold J. Mason, St. Paul, Minn.

Application July 12, 1956, Serial No. 597,446

4 Claims. (Cl. 18—55.1)

The invention herein has relation to a process of obtaining a bond between cast metal and plastic material, so-called, useful for a variety of purposes and especially useful in the art of dentistry to the accomplishment of bonding together of gold and plastic of artificial teeth, crowns, inlays, or bridges.

The process of preparing a metallic, plastic-faced prosthesis to repair or extend or reconstruct or even to replace natural teeth presently includes the step of making an impression in a tray of the mouth including the stub of the tooth which is to be built up and/or the portion of the mouth wherein the tooth is to be replaced. The next step is to pour a cast, sometimes called a stone cast, into the impression in the tray. This cast is, of course, a duplicate of the portion of the mouth in which the prosthesis is to be fitted. A wax pattern is then built up on this cast to be an exact duplicate of the metallic or gold portion of the prosthesis which will eventually be fit into the mouth. A sprue and preferably a crucible former are then attached to the wax gold-pattern and the wax gold-pattern is removed from the casting.

It will be understood that the transverse dimension of any particular portion of this gold-pattern may be quite small. The desired prosthesis must be an exact replica of this pattern, and must support a thin veneer of plastic material simulating the appearance of a natural tooth. It is highly desirable that only this facing or veneer of plastic be visible in the mouth of the person to whom the prosthesis is to be fitted.

Since the prosthesis must serve the function of the tooth or tooth portion which it replaces, the gold or other metallic portion of the casting must be in position to withstand the forces applied by virtue of biting and chewing action of the teeth. This action also causes certain forces and abrasive actions to be transmitted to the plastic veneer. The juices present in the mouth tend to penetrate between any substances such as metal and plastic which are bonded together in the mouth.

For the reasons aforesaid, the problem of effectively bonding the plastic veneer to the gold artificial tooth, crown, inlay or bridge has been a difficult one. One common method formerly employed was to cast an outstanding or overhanging rim of gold, and to then pour the plastic veneer in such a manner that it was held in by this rim. This has a very distinct disadvantage that the rim is then necessarily clearly visible around the periphery of the plastic and thus indicated the presence of the artificial tooth, crown, inlay or bridge.

The present invention can include the steps of adhering a plurality of relatively small globoid particles to a surface of the wax gold-pattern, of preparing an investment which is an exact impression or negative of this wax gold-pattern and of each of the globoid particles adhered thereto. This is done by pouring a liquid investment around the wax gold-pattern, sprue and crucible former while they are assembled within a casing ring. This investment is allowed to harden, and the crucible former and sprue are withdrawn manually and the wax and globoid particles are removed from the investment in the usual manner by heating the wax and globoid particles to cause them to be melted and destroyed.

Next, molten gold is forced through the sprue into the cavity in the investment left by the wax and the globoid particles in any usual manner, for example, by centrifugal action. This gold hardens and the investment is destroyed leaving the gold in the exact shape of the wax pattern but with globoid particles of gold attached thereto corresponding to each of the globoid particles which were originally adhered to the wax pattern.

This gold casting is placed on the original positive stone casting of the mouth portion, and a second wax pattern or plastic-pattern is built up on the gold casting to exactly simulate the plastic veneer desired. The gold casting and wax plastic-pattern are removed from the casting, and the plastic-pattern attached to a sprue and another investment is poured around the combination. When this investment has hardened, the wax is removed by heating or other suitable method, and the plastic is poured into the investment in its liquid form. After it has set, the investment is destroyed, and the gold-plastic prosthesis is completed. This prosthesis can then be properly finished by trimming, grinding, polishing, etc., if necessary or desired.

In the accompanying drawing forming a part of this specification,

Fig. 1 is an elevational view, partially in section, of a wax pattern attached to a sprue upon a crucible former.

Fig. 2 is a fragmentary elevational view of the wax pattern, sprue and crucible former of Fig. 1 disclosing a surface of the wax pattern as when supplied with a multiplicity of spaced particles of globular material;

Fig. 3 is a longitudinal sectional view disclosing a casing ring with investment and a casting mold, a concavity and a passageway between the mold and concavity in the investment;

Fig. 4 is a detail sectional view, taken on line 4—4 in Fig. 3;

Fig. 5 is an elevational view of a metallic casting, gold as shown, as when formed in the mold of Figs. 3 and 4, in simulation of the wax pattern with spaced globular particles as in Fig. 2;

Fig. 6 is a detail sectional view, taken on line 6—6 in Fig. 5;

Fig. 7 is an elevational view disclosing plastic material as when bonded to a metallic casting such as disclosed in Figs. 5 and 6; and Fig. 8 is a detail sectional view, taken on line 8—8 in Fig. 7.

After the wax gold-pattern has been built up on the mouth cast, removed therefrom and mounted on the sprue and crucible former, it will appear as seen in Fig. 1. In this figure, the wax gold-pattern is designated by numeral 10 and is supported upon a crucible former 11 through the instrumentality of a sprue 12.

In Fig. 2, the wax pattern 10 is disclosed as when a surface thereof is supplied with a multiplicity of spaced particles 13 of globular or globoid material, a step in the performance of the new and improved process.

A further step of the process herein presented, following the step of applying globular particles, such as 13, to a surface of a wax pattern, such as 10, is placement of the wax pattern with material having the form of a multiplicity of globules within a casting investment, such as 14, of suitable material, as, for example, plaster of Paris, usually encompassed by a casing ring, such as 15. In practice, a casing ring is ordinarily assembled with a crucible former, such as 11, and the investment is applied about the crucible former, a sprue, such as 12, thereon, and a wax pattern, such as 10, upon the sprue. In the new and improved process, the procedure can be the same, except that the wax pattern additionally will include spaced globular or globoid particles such as 13. The manner in which the wax pattern with globules is embedded in the investment as such forms no part of the present invention. Conveniently, the investment can surround a sprue, such as 12, and a crucible former, such as 11, so that when the crucible former and sprue are removed from the investment there will remain therein a casting mold 16 occupied by the wax pattern with spaced globules, a concavity, such as 17, open to an exterior surface of the investment and a passageway, such as 18, between the casting mold and concavity. The crucible former and sprue can be removed from the casting investment in any ordinary or preferred manner.

A succeeding step of the new and improved process is removal of the wax pattern and globular or globoid material from the investment, thus to produce a casting mold bounding or defining a chamber in simulation of the wax pattern with spaced globules, such as disclosed in Fig. 2 of the drawing. The explicit manner of removing the wax pattern and globular or globoid material from the casting mold is no part of the invention. This is well known in the art. A usual method consists of applying heat to the wax pattern and to the globoid material to cause this wax and globoid material to be destroyed or melted and to leave the mold. It should be remarked, however, that the globular or globoid material employed must be adhered to the wax pattern, as by employment of shellac or varnish or otherwise, and desirably the globular or globoid material and any adhesive employed therewith should be of nature to be removable from the casting mold in response to the performance of procedure customarily followed in the accomplishment of removal of wax patterns from casting molds. A suitable substance for providing the spaced globular or globoid particles to be secured upon wax patterns is an acrylic powder consisting of spherical particles, such as a polymer of methyl methacrylate. The specific substance utilized to provide the globules and the manner of their application to the wax pattern are, as such, not essential features of the process. Any substance suitable for the intended purpose can be employed, and application of the substance to the wax casting can be accomplished in any ordinary or preferred manner which may be appropriate. Of course, to be suitable, these globoid particles should be easily destructible and removable with the wax.

In Figs. 3 and 4 of the drawing there is disclosed an empty casting mold resulting from removal of a wax pattern with spaced globules, such as disclosed in Fig. 2, from the investment. Naturally, the empty casting mold bounds or defines a chamber in simulation of said wax pattern with spaced globules.

A step of the method following the step of providing the empty casting mold, as in Figs. 3 and 4, is the formation of a gold casting in said empty casting mold. Such a gold casting can be provided by causing melted to gold to flow into the casting mold to fill all of its spaces, including the globular or globoid spaces vacated by the globular or globoid material which was removed from the investment.

In Figs. 5 and 6 there is disclosed a gold casting as when formed in the mold of Figs. 3 and 4, simulating the wax pattern with spaced globules disclosed in Fig. 2. Production of the gold casting in and removal thereof from the casting mold can be accomplished by the performance of steps and in a manner well known in the art. A surface of the produced gold casting will integrally include spaced gold protuberances, each denoted 19, resulting from the flow of gold into the spaces which were vacated when the material of globular or globoid form was removed from the investment. As will be clear from said Figs. 5 and 6, each of the gold protuberances 19 is of substantially part-spherical configuration.

A procedure of the process succeeding the step of providing a gold casting as in Figs. 5 and 6 is the application of plastic material to the surface of the gold casting integrally including the protuberances of part-spherical form, such as 19. In Figs. 7 and 8 of the drawing, a slab 20 of plastic material, having an appropirate shape, is disclosed as when so applied.

In the performance of the operation of applying the plastic slab, a wax pattern which said plastic slab is to simulate can be applied to the surface of the gold casting having gold protuberances, such as 19, so that the gold protuberances individually are imbedded in the wax of the pattern. Then the gold casting with wax pattern thereon can be imbedded in an investment, and the wax pattern later can be removed from said investment to provide a chamber therein, contiguous with the surface of the gold casting integrally including the gold protuberances, in simulation of the last mentioned wax pattern. Thereafter, liquid plastic material can be placed in the chamber vacated by the removal of the wax of the last mentioned pattern and the plastic material allowed to become hardened. Upon removal of the gold casting with plastic material applied thereto from the investment, the operations of the new and improved process will have been completed. Of course, finishing operations upon the product, such as polishing, etc., can be accomplished after bonding of the gold casting and plastic material is accomplished. The performance of the several steps of the operations necessary to accomplish bonding of the gold casting and the plastic slab can be carried out in any ordinary or preferred manner.

As will be evident from Fig. 8 of the drawing, the gold protuberances, such as 19, integral with the surface of a gold casting to which a plastic slab, such as 20, is secured by practice of the process will be individually imbedded in the material of said plastic slab in such manner that surfaces of the plastic slab between gold protuberances are flush against the surface of the gold casting having said gold protuberances and that each of the part-spherical gold protuberances is snugly imbedded in a corresponding part-spherical depression in the plastic slab. Thus, each gold protuberance is individually bonded to and within the plastic slab. Together, the gold protuberances fixedly secure the plastic slab to the gold casting in such manner as to preclude its separation. That is to say, the bond between gold casting and plastic slab cannot be broken except by force sufficiently great actually to break the metal of the gold casting or the material of the plastic slab, as the case may be.

It will be obvious that several of the procedural steps hereinbefore described do not constitute necessary steps of the new and improved process. Essential steps of said process are as follows: provision of a pattern of wax, or equivalent, material having a multiplicity of spaced globules thereon, as in Fig. 2; production of a gold casting having gold protuberances, such as 19, integrally supported upon a surface thereof, as in Figs. 5 and 6, in simulation of the wax pattern with spaced globules, as in said Fig. 2; and securing of a plastic slab, such as 20, to and against the surface of the gold casting integrally supporting the gold protuberances in such manner that each of said gold protuberances is snugly imbedded in a part-spherical depression in said plastic slab with surfaces of the plastic slab between gold protuberances flush against the surface of the gold casting integrally supporting the gold protuberances.

What is claimed is:

1. The process of bonding a metallic casting and a slab of plastic material to and against each other which comprises the steps as follows: producing a wax pattern, attaching a multiplicity of spaced particles of general globular shape to a surface of said wax pattern in adjacent relation to each other and spread out over said surface, placing the wax pattern and the spaced particles attached thereto in an investment, removing the wax pattern and spaced particles from said investment thus to provide a concavity in the investment in simulation of said wax pattern and spaced particles, placing melted metal in said concavity and producing a metallic casting in simulation of the wax pattern and spaced particles and having thereon integral metallic protuberances of general part-spherical shape, and imbedding each of said metallic protuberances in a depression of corresponding configuration in a surface of a plastic slab to situate and retain said surfaces of the metallic casting and plastic slab, respectively, in flushingly engaged relation.

2. The process of bonding a metallic casting and a slab of plastic material to and against each other which comprises the steps as follows: producing a first wax pattern, attaching a multiplicity of spaced particles of general globular shape to a surface of said first wax pattern in adjacent relation to each other and spread out over said surface, placing the first wax pattern and the spaced particles attached thereto in an investment, removing the first wax pattern and spaced particles from said investment thus to provide a concavity in the investment in simulation of said first wax pattern and spaced particles, placing melted metal in said concavity and producing a metallic casting in simulation of the first wax pattern and spaced particles and having thereon integral metallic protuberances of general part-spherical shape, imbedding said metallic casting and a second wax pattern thereon in an investment with the surface of the metallic casting having said metallic protuberances engaged against and the metallic protuberances thereon snugly fitted into a surface of said second wax pattern, removing the second wax pattern from the last mentioned investment thus to provide a chamber therein contiguous with said metallic casting surface and metallic protuberances, and placing fluid plastic material in said last mentioned chamber and permitting said plastic material to harden.

3. The process of bonding a metallic casting and a slab of plastic material to and against each other which comprises the steps as follows: producing a first heat destructible pattern in simulation of a desired metallic casting, bonding a multiplicity of spaced, heat destructible globoids to said pattern on a surface thereof corresponding to the surface of the desired metallic casting which is to be ultimately situated against a slab of a desired plastic material, investing the first heat destructible pattern and multiplicity of globoids in a first investment, heating the first heat destructible pattern and multiplicity of globoids to destroy and remove said first pattern and spaced globoids thus to provide a concavity in the investment in simulation of said pattern and globoids, introducing molten metal into said cavity, allowing said molten metal to become solidified, removing said first investment from said resulting metal casting, producing a second heat destructible pattern in simulation of said plastic material and in adjacent contacting relationship to said metallic casting and said multiplicity of globoids, investing said metallic casting and second pattern in a second investment, applying heat to the second pattern in said second investment to destroy said second pattern thus to provide a chamber in said second investment, introducing fluid plastic material into said chamber, and causing said fluid plastic material to harden.

4. The method of preparing a metallic, plastic-faced dental prosthesis to serve as a crown, inlay or bridge on or over a portion of a natural tooth which includes the steps as follows:

Making an impression in a tray of said natural tooth portion; pouring a cast into said impression to duplicate the natural tooth portion; building up on said cast a first destructible pattern in simulation of the metallic impression of the desired prosthesis; coating a surface of said pattern in simulation of a surface of the metallic casting against which it is desired to support a plastic facing with an adhesive substance; introducing onto said adhesive-covered surface a plurality of spaced destructible globoids to bond said globoids to said pattern; investing the first destructible pattern and multiplicity of globoids in a first investment; destroying said first pattern and globoids bonded thereto, thus to provide a concavity in the investment in simulation of said first pattern and globoids; introducing molten metal into said cavity; allowing said molten metal to become solidified; removing said first investment from said resulting metal casting; producing a second destructible pattern in simulation of a desired plastic facing and in adjacent contacting relationship to said metallic casting and said multiplicity of globoids; investing said metallic casting and said second pattern in a second investment; destroying said second pattern in said second investment, thus to provide a chamber in said second investment; introducing said fluid plastic material into said chamber; and causing said fluid plastic material to harden.

References Cited in the file of this patent

UNITED STATES PATENTS

| | | |
|---|---|---|
| 1,747,249 | Korompay | Feb. 18, 1930 |
| 1,780,208 | Messer | Nov. 4, 1930 |
| 1,960,042 | Andrus | May 22, 1934 |
| 2,310,642 | Marcy | Feb. 9, 1943 |
| 2,356,513 | Gonon | Aug. 22, 1944 |
| 2,380,468 | Saffir | July 31, 1945 |
| 2,412,207 | Day | Dec. 10, 1946 |
| 2,441,695 | Feagin et al. | May 18, 1948 |
| 2,463,549 | Myerson | Mar. 8, 1949 |
| 2,463,550 | Myerson et al. | Mar. 8, 1949 |
| 2,700,184 | Levine | Jan. 25, 1955 |